R. L. WATKINS.
PHOTOMICROGRAPHIC APPARATUS.
APPLICATION FILED APR. 14, 1913.
1,214,851.
Patented Feb. 6, 1917.
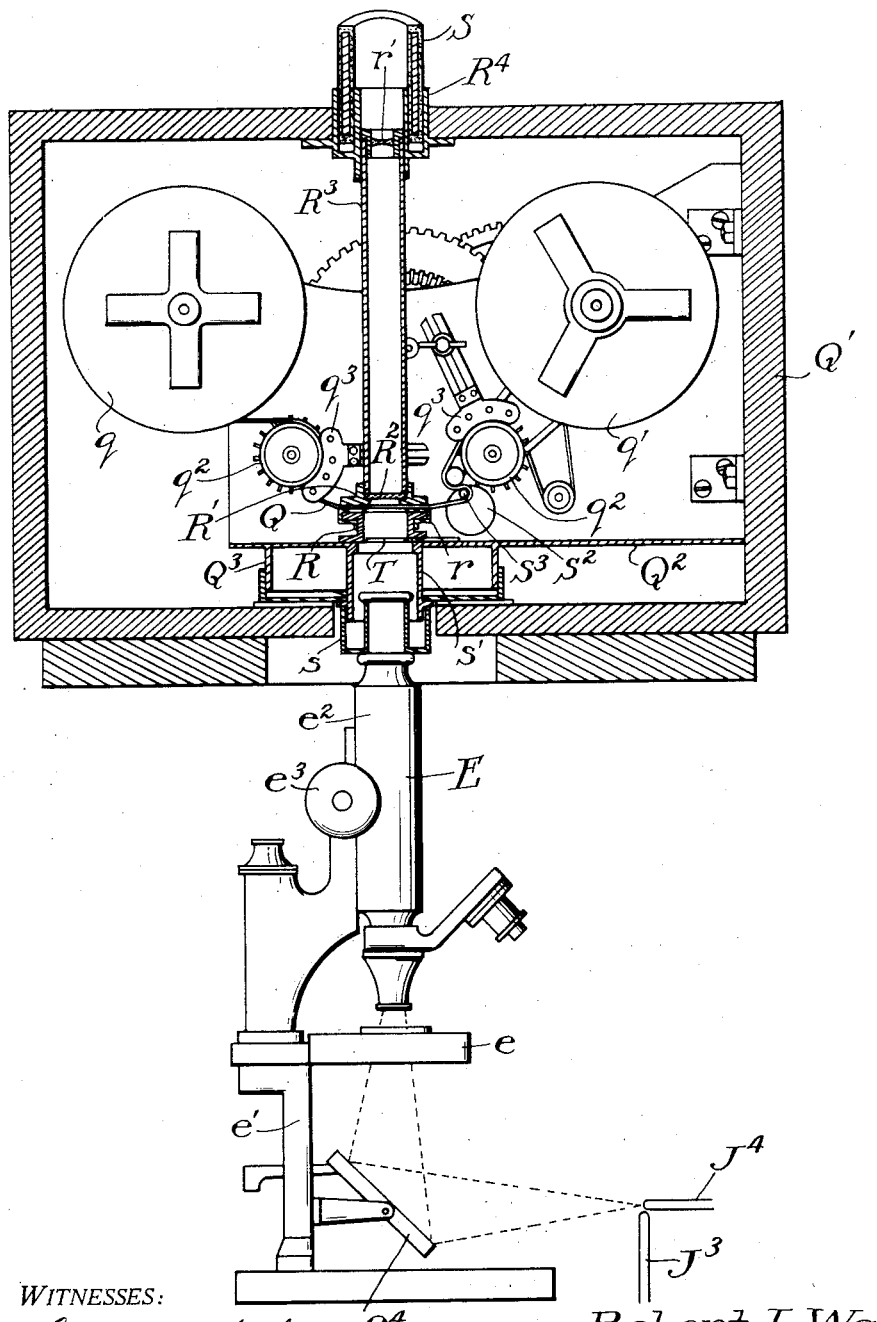
WITNESSES:
Cornelius Zabriskie
M. C. Rodriguez
INVENTOR
Robert L. Watkins.
BY
Griffin Bernhard
Attorneys

UNITED STATES PATENT OFFICE.

ROBERT L. WATKINS, OF NEW YORK, N. Y.

PHOTOMICROGRAPHIC APPARATUS.

1,214,851. Specification of Letters Patent. Patented Feb. 6, 1917.

Continuation of application Serial No. 373,985, filed May 16, 1907. This application filed April 14, 1913. Serial No. 760,871.

*To all whom it may concern:*

Be it known that I, ROBERT L. WATKINS, a citizen of the United States, residing at the city of New York, borough of Manhattan, county and State of New York, have invented a certain new and useful Photomicrographic Apparatus, of which the following is a specification.

This invention is a photomicrographic apparatus by which objects, such as blood specimens and other subjects, may be magnified and photographed in rapid succession.

The present application is a continuation of a prior application filed by me on May 16, 1907, Serial No. 373,985 for an invention entitled "Photomicrographic camera" as to all matter common to the two applications.

In certain kinds of microscopic work it is desired to secure photographs of varying conditions of the subject under examination. For example, when a specimen of the human blood is examined under the microscope, it is desirable, and in some instances essential, that a medical record be secured showing at different successive periods the movement of the corpuscles of the blood, as well as the movement of the individual blood cells. This record is secured from a specimen consisting of one or more drops of the human blood, freshly drawn from the patient, and thereafter deposited on a slide and introduced into the microscope without appreciable loss of time. The operation of photographing the specimen should, manifestly, be conducted as expeditiously as possible in order to secure a photographic record of the blood while the corpuscles and cells are in motion. While I have mentioned one use of the apparatus in obtaining a photomicroscopic record of the human blood, it is apparent that the apparatus of the invention is useful in obtaining similar records of many other subjects.

To obtain the results desired, I employ a microscope or magnifying apparatus in combination with a moving picture taking apparatus wherein a sensitized photographic film is moved at intervals across the field of the microscope, the latter operating to project magnified images of the subject under examination. With the microscope and the intermittently moved photographic film mechanism it is preferred to employ means of one kind or another for producing a beam of light of such intensity as to project the image magnified by the microscope onto the film so as to attain the required photographic pictures.

The employment of the continuous sensitized film exposed rapidly to the images projected by the microscope, with or without the means for producing artificial light, is an important factor in obtaining microscopic pictures of the specimen under examination, for the reason that the intermittent movement of the continuous sensitized film affords the necessary photographic surfaces to secure the latent impressions without involving delay and loss of time incident to changing the usual photographic plates.

In the drawings, the figure represents a vertical section, partly in elevation, of my apparatus for securing a succession of microscopically enlarged pictures in accordance with this invention.

In the drawings I have shown one form of apparatus adapted for use in connection with a microscope E and a source of light, such as an arc lamp, the carbons of which are indicated at $J^3$ $J^4$, for the purpose of producing successive photomicrographs on a continuous sensitized film Q. The general construction of the apparatus for moving the continuous sensitized film Q is similar to that employed in "moving picture machines," and for this reason I will not describe in detail the several working parts of said moving picture machine. As shown, however, the film is uncoiled from a feed spool $q$ and is coiled upon a take-up spool $q'$, said spools being suitably mounted within a light-tight casing Q'. As the film passes from one spool to the other it is engaged by feed wheels $q^2$, and it passes between suitable guides $q^3$, which guides operate to hold the film in engagement with said feed wheels.

Within the casing is a horizontal diaphragm or partition $Q^2$, the latter being connected with the bottom of the casing by a light-tight coupling $Q^3$.

Secured to the top of the partition is a sleeve R, the upper part of which sleeve is provided with a lining $r$ engaging with a collar R' to produce a light-tight connection therewith. Said collar contains a ground glass $R^2$ which is positioned across the lower part of a vertical sight tube R³, the latter extending upwardly within casing Q' and containing a suitable lens r'.

Around the upper part of the vertically positioned sight tube is fitted a double tube R⁴, the latter extending upwardly through the top of casing Q', and fitted between the members of this double tube is a lined eyepiece S, the latter being provided with suitable means for holding the eye-piece steadily in position over the eye of an operator.

The microscope is represented as consisting of a table e, a base or stand e' for supporting the table, a lens tube e², a screw adjustment e³ for focusing said lens tube, and a mirror e⁴, the latter being positioned below the table and being adjustable to different positions for reflecting the rays of light emanating from the arc lamp through the lens, table and the subject on the table.

The microscope is positioned in operative relation to the moving picture mechanism contained within casing Q', and as shown the microscope is removable at will from said casing. Of course, means should be provided for excluding light from entering casing Q' except that beam of light which is projected by the microscope. For securing this object I have shown a light-tight coupling between the lens tube of the microscope and the casing Q'. Said coupling consists of a double flanged member s and a tube s' fitted between the flanges of said member s. The tube s' is fastened to or otherwise engaged with partition Q² so as to depend downwardly therefrom, whereas the double flanged member s is positioned over the upper part of lens tube e² of the microscope. When properly positioned the microscope is in alinement with sight tube R³ and by using the two-part coupling s s' the external rays of light are precluded from entering casing Q' through the opening which is provided in the bottom of the casing for the reception of the microscope.

The feed wheels and take-up spool q' of the film operating mechanism are adapted to be driven by a motor or equivalent mechanism, for the purpose of imparting movement to the sensitized film, but this movement is given intermittently to the film by a suitable device actuated by the motor. As shown, the device embodies a disk S² which is provided with a member, such as a pin S³ positioned for engagement with the non-sensitized surface of the film. When said disk and the attached pin are rotated the film remains practically at rest during a part of such rotation, but at another period in the rotation of the pin the latter draws on the film for moving it a predetermined distance. Said film is similar to those ordinarily used in moving picture machines, i. e., it is provided with perforations near the respective edges thereof.

Preferably the width of the film is less than the diameter of sight tube R³ and the focusing glass R². The film passes between sleeve R and collar R', so that it is adapted for movement between the focusing glass R² and lens tube e² of the microscope. A shutter T, similar to those used in moving picture machines, operates between the film and the lens tube of the microscope.

It will be understood that the operator may view the subject through sight tube R³, for the reason that the image is projected by the microscope against focusing glass R², a portion of the subject being visible at the edges of the film. The sight tube enables the operator to adjust the microscope for securing the proper focus.

In operation an enlarged image is projected by the microscope against the sensitized surface of film Q when shutter T is open. The motor being in operation, the disk S² is rotated and advances a certain length of film across tube R, whereby the exposure is made to secure a latent impression on the sensitized surface of the film. The shutter closes and the film is moved by disk S², whereby the film is coiled upon the take-up spool q', and at the same time a fresh length of film is uncoiled from feed spool q. These operations are repeated to secure a desired number of latent impressions on the sensitized surface of the film. Obviously, the film can be removed from the machine, developed and fixed in the ordinary way to produce a picture film which may be employed in the so-called moving picture machines, whereby a succession of pictures may be displayed on a screen, which pictures represent the movement of the corpuscles of blood as the latter circulate in the human system, or as the blood cells move individually, this adaptation of the apparatus being especially useful for lecture purposes.

In photographing certain specimens, such as specimens of the human blood for medical purposes, it is desired to secure a record at different successive periods for the purpose of showing the movement of the corpuscles, as well as the individual movement of the cells in the blood. This photographic record is taken from one or more drops of human blood drawn fresh from the patient, deposited on a slide to be used in the microscope, and the subject is immediately photographed, the operations being performed as expeditiously as possible in order to secure photographic exposures of the blood specimen while the corpuscles and cells thereof are in motion. By employing the continuous sensitized film adapted to be exposed rapidly across the field of the microscope, and by using a light of the power furnished by the electric arc, I am able to obtain photomicrographic records of the condition of the human blood, for the reason that the electric arc furnishes the light required to secure the instantaneous photographic exposures, and the intermittent movement of the film affords the necessary photographic surfaces for securing the latent impressions of the enlarged images projected by the microscope, the intermittently moving film being particularly useful for the reason that it obviates the delay and loss of time required to change a number of sensitized photographic plates.

Having thus fully described the invention, what I claim as new, and desire to secure by Letters Patent is:

1. An apparatus for making photographs of enlarged images in rapid succession embodying a casing, means for supporting and intermittently feeding a sensitized transparent film, means for projecting magnified images of a subject onto said film, and means positioned for viewing from the rear of the film the magnified images projected thereon.

2. An apparatus for making photographs of images in rapid succession embodying a casing, means for supporting a sensitized transparent film therein, means for feeding said film intermittently, means positioned in front of the film for projecting images of a subject onto said film, and observation means positioned at the rear of the film for viewing said images as they are projected on the film.

3. An apparatus for obtaining photo-microscopic enlargements of subjects in rapid succession embodying a light-tight casing provided with a light inlet, film-supporting means positioned within said casing, means for feeding and exposing said sensitized film intermittently, a microscope positioned in register with said light inlet for projecting enlarged images of the subjects onto said sensitized film, means whereby the admission of light rays to the interior of said casing is excluded except through said microscope, and a source of light the rays of which are directed through said microscope.

4. An apparatus for obtaining photo-microscopic enlargements of subjects in rapid succession embodying a casing, film-supporting means therein, means for feeding and exposing said film intermittently, a source of light, a microscope positioned in operative relation to the casing and to the source of light whereby a beam of light is adapted to be directed through said microscope and to project onto the film enlarged images of the subjects, and means in cooperative relation to the casing and to the microscope for excluding all other light rays from the casing except the beam of light.

5. An apparatus for obtaining photo-microscopic enlargements of subjects in rapid succession embodying a casing, film-supporting means therein, feed means for intermittently moving and exposing said film, a source of light affording an intense beam for securing instantaneous photographic exposures, and a microscope positioned in operative relation to the casing and to the source of light whereby the beam of light is adapted to be directed through the microscope for projecting onto the film enlarged images of the subjects, said microscope being removable at will from operative relation to said casing.

6. In an apparatus for obtaining photo-microscopic enlargements of subjects in rapid succession, the combination with a casing affording a photographic dark room, of a microscope provided with a specimen-retaining stage, said microscope being positioned for projecting enlarged images of subjects into said photographic dark room, and means whereby a sensitized film is intermittently moved within said dark room of the casing so as to feed the film across the path of, and to expose said film intermittently to, the enlarged images projected by said microscope.

7. In an apparatus for obtaining photo-microscopic enlargements of subjects in rapid succession, the combination with a light-tight casing affording a photographic dark room, means for supporting, feeding and exposing a sensitized film therein, a source of light, and a microscope positioned in operative relation to said casing and to the source of light, said microscope being provided with means for intercepting the light rays whereby a beam of light is directed through the microscope and enlarged images of the subjects are thrown onto said film.

8. The herein-described method of taking enlarged pictures of micro-organisms upon a sensitized film, which consists in projecting a beam of light into a dark room, to the exclusion of all other light from said chamber, placing a micro-organic body in the direct path of said beam, moving such film within said chamber intermittently across said beam of light so that the light of said beam is the sole light cast on said film, projecting a magnified image of said micro-organic body onto said film through the medium of said beam, whereby clear cut magnified images are obtained, and afterward developing the said film.

9. The herein-described method of taking enlarged pictures of micro-organisms upon a sensitized film, which consists in projecting a reflected beam of light into a dark chamber, to the exclusion of all other light from said chamber, placing a micro-organic body in the direct path of said beam, moving such film within said chamber intermittently across said beam of light so that the light of said beam is the sole light cast on said film, and projecting a magnified image of said micro-organic body onto said film through the medium of said beam, whereby clear cut magnified images are obtained, and afterward developing the said film.

10. The herein-described method of taking enlarged pictures of micro-organisms upon a sensitized film, which consists in projecting a beam of light into a dark chamber, to the exclusion of all other light from said chamber, placing a micro-organic body in the direct path of said beam, moving such film within said chamber intermittently across said beam of light so that the light of said beam is the sole light cast on said film, projecting a magnified image of said micro-organic body onto said film through the medium of said beam, whereby clear cut magnified images are obtained, afterward developing the said film, and transmitting the reflection of the said magnified images to the eye of an observer.

In testimony whereof I have signed my name to this specification in the presence of two subscribing witnesses.

ROBERT L. WATKINS.

Witnesses:
H. I. BERNHARD,
M. C. RODRIGUEZ.